March 28, 1961 A. C. ROETHLISBERGER 2,977,449

BUS DUCT PLUG-IN UNIT

Filed July 17, 1958 3 Sheets-Sheet 1

WITNESSES:
Bernard R. Gieguez
James F. Young

INVENTOR
Arthur C. Roethlisberger
BY [signature]
ATTORNEY

March 28, 1961 A. C. ROETHLISBERGER 2,977,449

BUS DUCT PLUG-IN UNIT

Filed July 17, 1958 3 Sheets-Sheet 2

United States Patent Office 2,977,449

Patented Mar. 28, 1961

1

2,977,449

BUS DUCT PLUG-IN UNIT

Arthur C. Roethlisberger, Brighton Township, Beaver County, Pa., assignor to Westinghouse Electric Corporation, East Pittsburgh, Pa., a corporation of Pennsylvania Filed July 17, 1958, Ser. No. 749,289

8 Claims. (Cl. 200—168)

This invention relates, generally, to bus ducts and, more particularly, to plug-in units for installing on bus duct housings.

It is the usual practice to provide each plug-in unit with phase contact members, or stab connectors, which engage phase bus bars inside the bus duct housing when the plug-in unit is in its operating position on the duct housing. Frequently, a plug-in unit is also provided with a neutral contact member, or stab connector, for engaging a neutral bus bar inside the duct housing. The conductors for connecting the phase stabs to the terminals of the circuit interrupter in the plug-in unit are usually installed at the factory when the unit is assembled. The connection to the neutral stab may not be made until after the unit is installed on a duct housing. Thus, there is danger of contacting the phase stab connections, which are energized, while making the neutral stab connection. A barrier of the type described in Patent No. 2,641,636, issued June 9, 1953, does not preclude the aforesaid danger since it is necessary to remove the barrier in order to make the neutral stab connection.

An object of the invention is to prevent access to the phase stab connections of a plug-in unit without preventing access to the neutral stab connection.

Another object of the invention is to provide a barrier for a plug-in unit which cooperates with the circuit interrupter in the unit to prevent access to the phase stab connections in the unit.

A further object of the invention is to provide a barrier for a plug-in unit which is frictionally held in position in the unit.

Still another object of the invention is to provide a base for supporting stab connectors of a plug-in unit which also functions as a barrier to prevent access to the base stab connections.

Other objects of the invention will be explained fully hereinafter or will be apparent to those skilled in the art.

In accordance with one embodiment of the invention, the barrier for a bus duct plug-in unit is composed of a resilient transparent material and is so curved that one end is held underneath the circuit interrupter and the other end snaps underneath one edge of the opening in the bottom of the unit housing for the phase stab connectors, thereby preventing access to the phase stab connectors without preventing access to the neutral stab connector which is not underneath the barrier.

In accordance with another embodiment of the invention, a combined base and barrier is molded from nylon or other suitable material and is so mounted in the unit housing that it supports the stab connectors and also

2 acts as a barrier to protect the stabs and the connections between the stabs and the terminals of the circuit interrupter.

Either embodiment of the invention prevents a fish wire or other wiring tool from contacting an energized conductor or stab connector while making electrical connections to the plug-in unit. Ready access to the neutral stab connector is not prevented by either device.

For a better understanding of the nature and objects of the invention, reference may be had to the following detailed description, taken in conjunction with the accompanying drawings, in which.

Figure 1:
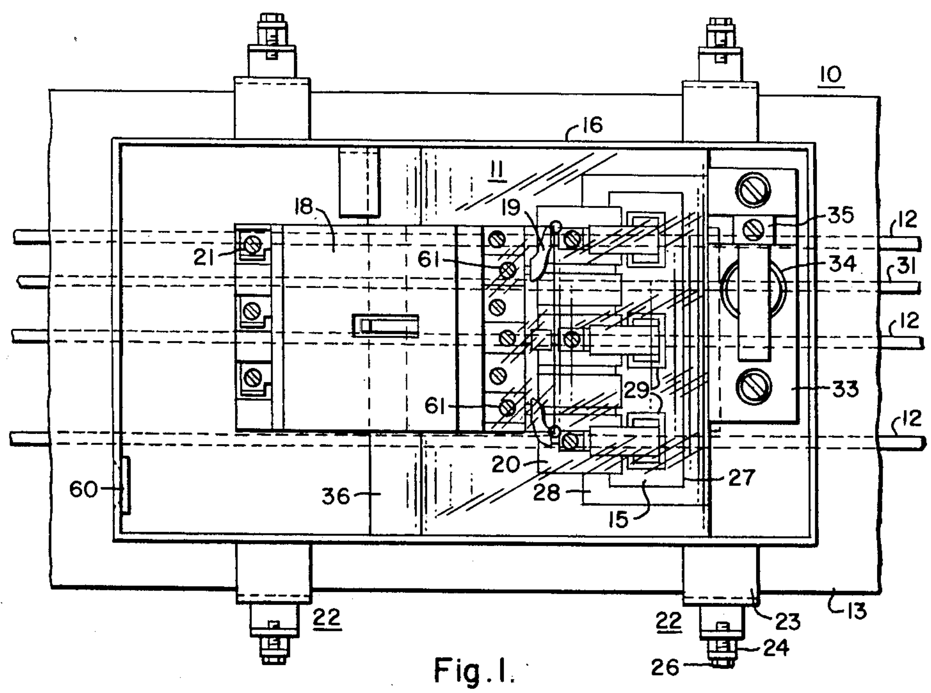
Figure 1 is a view, in plan, of a portion of a bus duct with a plug-in unit embodying the principal features of the invention, the cover for the plug-in unit enclosure being removed.
Figure 2:
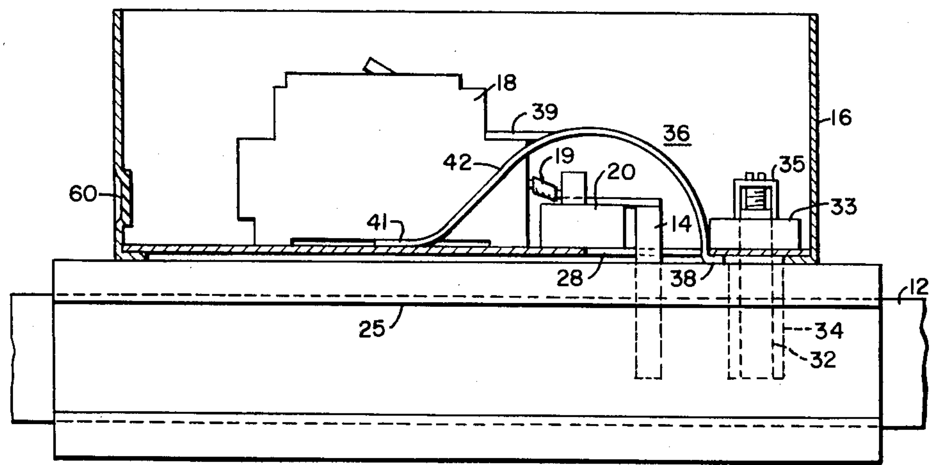
Fig. 2 is a view, partly in side elevation and partly in section, of the structure shown in Fig. 1.

Referring to the drawings, and particularly to Figs. 1 and 2, the structure shown therein comprises a portion of a bus duct 10 having a plug-in unit 11 installed thereon. The bus duct 10 is of the plug-in type having phase bus bars 12 which are so disposed within a metal housing or duct 13 that they may be engaged by contact members 14, which are commonly called stab connectors, provided on the plug-in unit 11. The bus bars 12 are supported by suitable insulating members 15 which are usually located at regular intervals along the duct, as shown more fully in Patent No. 2,725,541, issued November 29, 1955.

The plug-in unit 11 comprises a metal housing 16 having a removable or openable cover (not shown). A circuit interrupting device 18, which may be an automatic circuit breaker, is mounted inside the housing 16 and has its line terminals electrically connected to the contact members or stabs 14 by circuit connections 19. The stab connectors 14 are supported by an insulating base 20 attached to the bottom wall of the housing 16. In this manner the circuit breaker 18 is connected to the bus bars 12 when the plug-in unit 11 is in the operating position on the duct housing 13. It will be understood that load terminal connectors 21 on the circuit breaker 18 may be connected by suitable conductors to power consuming machines or other electrical apparatus. These connections may be made through wires in conduits entering the housing 16 through knockouts 60.

In accordance with the usual practice, the plug-in unit 11 may be clamped directly to the duct housing 13 by means of clamping devices 22 which may be of the type described in Patent 2,725,541, issued November 29, 1955. As described in the aforesaid patent, each clamping device comprises a generally U-shaped member 23 which is so secured to the plug-in unit that the legs of the U function as guides when the unit is being installed on a bus duct housing. A clamping member 24 is so attached to the member 23 that it engages a flange 25 on the bus duct housing 13. A screw 26 is provided in the member 23 for retaining the clamp 24 in engagement with the flange 25.

As shown most clearly in Fig. 1, the insulator 15 is disposed in an opening 27 in the top of the bus duct housing 13 and the stab connectors 14 extend through an opening 28 in the bottom of the plug-in unit housing 16 which is in alignment with the opening 27 in the bus duct housing. The insulator 15 is provided with openings 29 into which the stabs 14 are inserted to engage the bus bars 12.

As explained hereinbefore, a neutral or grounded bus bar is provided in certain power distribution systems. As shown in Fig. 1 a neutral bar 31 may be located in the duct housing 13 between two of the phase bars 12. A stab connector 32, similar to the phase stab connectors 14, may be mounted on an insulating support 33 attached to the bottom wall of the plug-in unit housing 16. The stab connector 32 may be surrounded by an insulating shield 34 to prevent it from making contact with one of the phase bus bars. A terminal connector 35 is provided for making an electrical connection to the stab connector 32.

As also explained hereinbefore, the electrical connections between the phase stab connectors 14 and the line terminals 61 of the circuit interrupter 18 are usually made at the factory when the plug-in unit is manufactured. The electrical connection to the neutral stab connector 32 is usually made when the connections are made to load terminals 21, and this may be done when the plug-in unit is installed on the bus duct housing. The electrician making these connections may consider this to be safe since the load terminals 21 may be deenergized by opening the switch or circuit breaker 18, and since the neutral is usually grounded. However, there is danger of accidental contact being made with the stab connectors 14, which are energized, when making the connection to the neutral stab connector.

In order to preclude the possibility of contact being made with the stab connectors 14, or the electrical connections which connect the stabs 14 with the line terminals of circuit interrupter 18, an insulating barrier 36 is provided. The barrier 36 is preferably composed of a resilient transparent material, such as a transparent plastic.

Figure 5:
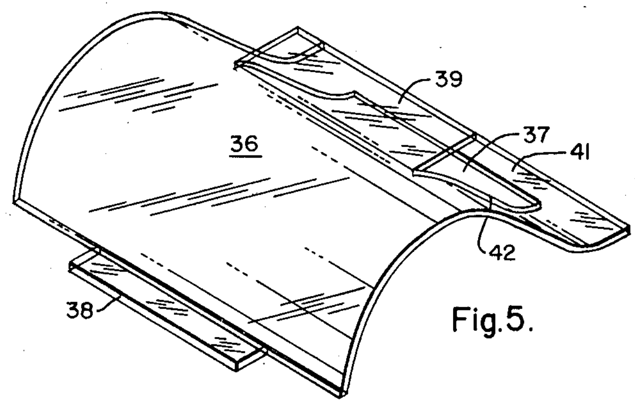
Fig. 5 is a view, in perspective, of the barrier utilized in the structure shown in Figs. 1 and 2.

As shown most clearly in Fig. 5, the barrier 36 is curved in shape. It has an opening 37 therein for receiving one end of the base of the circuit interrupter 18. A projection 38 is provided on one side of the barrier 36. Another projection 39 is provided at the top of the opening 37.

As shown most clearly in Fig. 2, the barrier 36 is installed in the housing 16 with one end of the circuit interrupter 18 in the opening 37 and a portion 41 of the barrier being disposed underneath the interrupter 18. The projection 39 is disposed on top of a shelf on the interrupter 18 and portions 42 of the barrier overlap the sides of the interrupter 18. The projection 38 on the barrier may be snapped under the one edge of the opening 28 in the bottom wall of the housing 16, thereby retaining the barrier in position. The projection 39 of the insulating material extends over and covers the line terminal screws 61, so as to prevent accidental contact therewith, in addition to the protection normally afforded by the fact that the line terminals 61 are recessed in the end portions of the insulating housing of the interrupter 18.

Since the barrier is substantially the same width as the inside of the housing 16 it prevents contact from being made with the phase stab connectors 14 and the electrical connections to the phase stab connectors. However, it does not prevent access to the terminal connector 35 for making an electrical connection to the neutral stab connector 32. As previously stated, the barrier may be made of a transparent material, thereby enabling the stab connectors 14 to be visible from above the plug-in unit which facilitates the installing of the unit on the duct housing, as is fully described in the aforesaid Patent 2,641,636.

The insulating barrier 36 may be installed by inserting the barrier in the housing 16 and installing the circuit interrupter 18 over the portion 41 of the barrier. After the electrical connections 19 are installed, the projection 38 of the barrier is snapped into position underneath the one edge of the one opening 28. Thus, no screws or brackets are required to retain the barrier in position other than the screws which retain the circuit interrupter 18 in the housing 16. The present barrier is substantially stronger than the flat barrier described in Patent 2,641,636, since the present barrier has a curved surface. It has the further advantage over the use of a flat barrier, that it extends down to the bottom of the housing 18, and protects against metal members being pushed under the barrier and into contact with the stab connectors 14. This danger existed because it is common practice to pull wires into the conduit connected to the knockout 60 using a stiff metal fish wire which is pushed through the conduit and into the housing 18. If the insulating barrier did not extend down to the bottom of the housing, the fish wire could go under the barrier and touch the connectors 14 and cause a short circuit.

Figure 3:
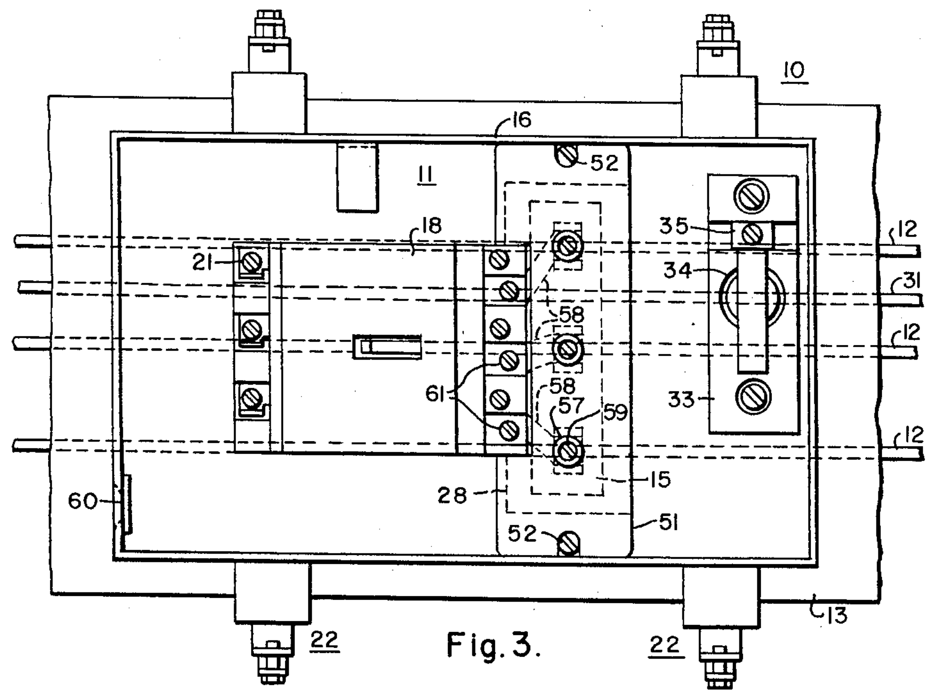
Fig. 3 is a view, similar to Fig. 1, of a modification of the invention.
Figure 4:
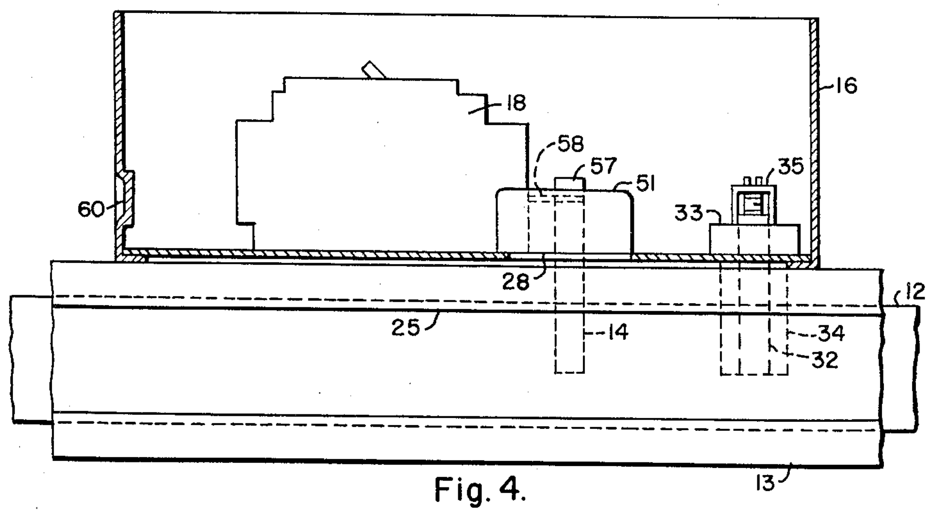
Fig. 4 is a view, similar to Fig. 2, of the modified structure.

In the modification of the invention shown in Figs. 3 and 4, the phase stab connectors 14 are supported by a combined base and barrier 51 which is attached to the bottom wall of the housing 16 by screws 52. The base 51 may be molded from nylon or from a suitable transparent insulating material. As shown in Figs. 3 and 4, the base 51 covers the opening 28 in the bottom wall of the housing 16.

Figure 6:
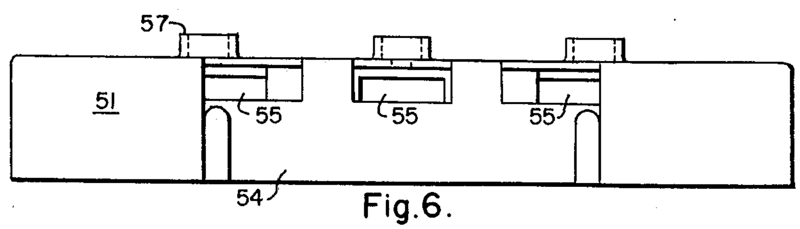
Fig. 6 is an enlarged view, in side elevation, of the combined base and barrier utilized in the structure shown in Figs. 3 and 4.
Figure 7:
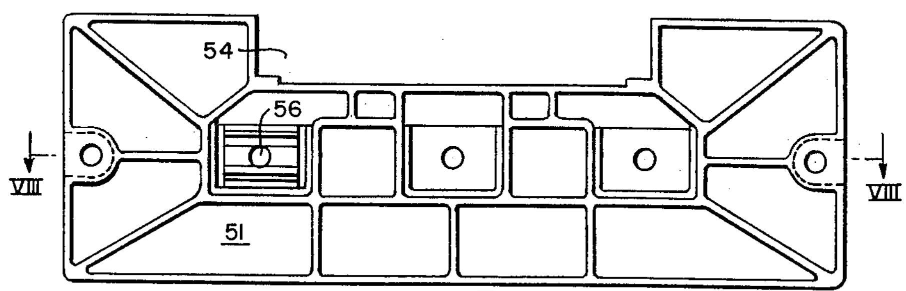
Fig. 7 is an enlarged view, in bottom plan, of the combined base and barrier shown in Fig. 6.
Figure 8:
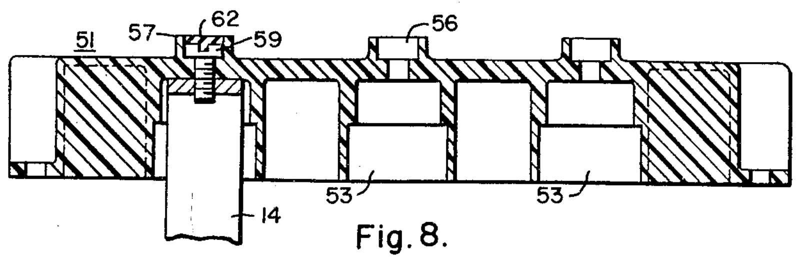
Fig. 8 is an enlarged view, in section, taken along the line VIII—VIII in Fig. 7.

As shown most clearly in Figs. 6, 7 and 8, the insulating barrier and base 51 has recesses 53 in the bottom thereof for receiving the stab connectors 14. The base also has a recess 54 on one side thereof for receiving one end of the circuit interrupter 18. Horizontally extending openings 55 are provided in the base 51 for connecting the recesses 53 with the recess 54. Vertically disposed openings 56 extend from the top of the recesses 53 to the top of the base 51. Each opening 56 is surrounded by a circular ridge 57.

As shown in Figs. 3 and 4, the base 51 is so mounted on the bottom wall of the housing 16 that portions of the ends of the base overlap the circuit interrupter 18, one end of which is disposed in the recess 54. Electrical conductors 58 extend through the openings 55 to connect the phase stab connectors 14 to the line terminals of the interrupter 18. The conductors 58 are attached to the stab connectors 14 by screws 59 which are disposed in the openings 56 inside the ridges 57. The screws 59 function to retain the stab connectors 14 in the recesses 53 in the base. Since the ridges 57 extend above the heads of the screws 59, the screws 59 are protected from contact by one making an electrical connection to the neutral stab connector 32. Further protection may be given by filling the recess within ridges 57 with wax as shown at 62 in Fig. 8.

Also, since the conductors 58 are disposed in the openings 55 which are beneath the top surface of the base 51 and since the sides of the combined base and barrier 51 extend down to the bottom of the housing 16, the danger of the fish wire coming in contact with these conductors or the stabs is precluded. Likewise, accidental contact cannot be made with the stab connectors 14, since the upper ends of the stabs are protected by the base 51 which is mounted on the bottom wall of the housing and its ends overlap the portion of the circuit interrupter 18 containing the terminals for connecting the interrupter to the stab connectors 14. The overlapping portions of the base 51 cover the opening 28 in the bottom wall of the housing 16 to prevent contact with the stabs through this opening. Thus, the stab connectors 14 and the electrical conductors between the stab connectors and the circuit interrupter 18 are protected against accidental contact while making the electrical connection to the connector 35 for the neutral stab connector 32. If the base 51 is composed of a transparent insulating material, the installation of the plug-in unit on the bus duct housing is facilitated as described in the aforesaid Patent 2,641,636.

It will be noted that the embodiment of Figs. 3 and 4 has the advantage that the single piece of molded insulating material 51 takes the place of both the base block 20 for supporting the stab contacts and the protective barrier 36 of Figs. 1 and 2. This reduces the cost of the parts and of the assembly labor, while retaining many of the advantages and functions of the two pieces. Also, the stab connectors 14 are supported more rigidly by the base 51 since the bight of the U-shaped stab is attached directly to the base instead of being supported in cantiliver as is the case in the structure shown in Figs. 1 and 2.

From the foregoing description it is apparent that the present invention provides for preventing access to the members of a bus duct plug-in unit which are connected to the phase bus bars of a bus duct without preventing access to the connector for the neutral stab connector of the plug-in unit. Thus, the possibility of accidental contacts being made with the energized phase connections while making an electrical connection to the neutral connector is precluded. In this manner the safety of the apparatus is increased.

Since numerous changes may be made in the above described construction, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A bus duct plug-in unit comprising a metal housing having an opening through the back wall thereof with stab connectors extending through the opening, an enclosed circuit interrupter disposed in the housing, electrical connections between one end of the interrupter and the inner ends of the stab connectors, edges of the opening in the back of the housing being spaced from the stab connectors to provide an opening substantially greater than the cross-sectional area of the stab connectors, and an insulating barrier covering the opening and the inner ends of the stab connectors and the electrical connections, said barrier having a portion engaging the back wall of the housing and a cutout for receiving one end of the enclosure for the interrupter and other portions overlapping opposite sides of the enclosure for the interrupter to prevent access to the inner ends of the stab connectors and the electrical connections.

2. A bus duct plug-in unit comprising a metal housing having an opening through the back wall thereof with stab connectors extending through the opening, an enclosed circuit interrupter disposed in the housing, electrical connections between one end of the interrupter and the inner ends of the stab connectors, edges of the opening in the back of the housing being spaced from the stab connectors to provide an opening substantially greater than the cross-sectional area of the stab connectors, and a curved resilient insulating barrier covering the opening and the inner ends of the stab connectors and the electrical connections, said barrier having a portion disposed underneath the circuit interrupter and another portion frictionally retained in the housing.

3. A bus duct plug-in unit comprising a metal housing having an opening through the back wall thereof with phase stab connectors extending through the opening, a neutral stab connector extending through said back wall, a circuit interrupter disposed in the housing, electrical connections between one end of the interrupter and the inner ends of the phase stab connectors, and a curved resilient insulating barrier covering the opening for the phase stab connectors and the inner ends of the phase stab connectors and the electrical connections, said barrier having an opening therein for receiving one end of the circuit interrupter and a portion disposed underneath the circuit interrupter and another portion secured adjacent to said neutral stab connector to prevent access to the inner ends of the phase stab connectors and the electrical connections without preventing access to the neutral stab connector.

4. A bus duct plug-in unit comprising a metal housing having an opening through the back wall thereof with phase stab connectors extending through the opening, a neutral stab connector extending through an additional opening in said back wall, an enclosed circuit interrupter disposed in the housing, electrical connections between one end of the interrupter and the inner ends of the phase stab connectors, a curved resilient insulating barrier covering the opening for the phase stab connectors and the inner ends of the phase stab connectors and the electrical connections, said barrier having an opening therein for receiving one end of the circuit interrupter, and a portion of the barrier being hooked under one edge of the opening for the phase stab connectors adjacent to said neutral stab connector to prevent access to the inner ends of the phase stab connectors and the electrical connections without preventing access to the neutral stab connector.

5. In a bus duct plug-in unit, in combination, a metal housing having an opening through the back wall thereof, a circuit interrupter in the housing, phase stab connectors extending through the opening, electrical connections between one end of the interrupter and the inner ends of the stab connectors, a base for supporting said stab connectors, said base having a separate recess therein for each one of said stab connectors, a recess in one side of the base for one end of the circuit interrupter, and separate covered openings in said base for said electrical connections, each one of said openings extending underneath the top of the base between one of the recesses for the stab connectors and the recess for the interrupter.

6. In a bus duct plug-in unit, in combination, a metal housing having an opening through the back wall thereof, an enclosed circuit interrupter in the housing, phase stab connectors extending through the opening, electrical connections between one end of the interrupter and the inner ends of the stab connectors, a combined base and barrier for supporting said stab connectors, said base being attached to the back wall of the housing and covering the opening in the back wall, said base having a separate recess in the bottom thereof for each one of said stab connectors, a recess in one side of the base for one end of the circuit interrupter, and separate covered openings in said base for said electrical connections, each one of said opening extending underneath the top of the base between one of the recesses for the stab connectors and the recess for the circuit interrupter.

7. In a bus duct plug-in unit, in combination, a metal housing having an opening through the back wall thereof, an enclosed circuit interrupter in the housing, phase stab connectors extending through the opening, electrical connections between one end of the interrupter and the inner ends of the stab connectors, a combined base and barrier for supporting said stab connectors, said base being attached to the back wall of the housing and covering the opening in the back wall, said base having a separate recess in the bottom thereof for each one of said stab connectors, a recess in one side of the base for one end of the circuit interrupter, portions of said base overlapping opposite sides of the circuit interrupter, and separate covered openings in said base for said electrical connections, each one of said openings extending underneath the top of the base from one of the recesses for the stab connectors to the recess for the circuit interrupter.

8. In a bus duct plug-in unit, in combination, a metal housing having a opening through the back wall thereof, a circuit interrupter in the housing, phase stab connectors extending through the opening, a neutral stab connector extending through said back wall, electrical connections between one end of the interrupter and the inner ends of the phase stab connectors, a base for supporting said phase stab connectors, one side of said base adjoining the circuit interrupter, said base having a separate recess therein for each one of said phase stab connectors, openings in said base for said electrical connections, each one of said openings extending underneath the top of the base between one of said recesses and the side of the base adjoining the interrupter, and said base covering the opening in the back wall of the housing, whereby access is prevented to the phase stab connectors without preventing access to the neutral stab connector.

References Cited in the file of this patent

UNITED STATES PATENTS

| | | |
|---|---|---|
| 2,149,994 | Frank et al. | May 7, 1939 |
| 2,361,179 | De Mask | Oct. 24, 1944 |
| 2,641,636 | Born et al. | June 9, 1953 |
| 2,786,908 | Constantine et al. | Mar. 26, 1957 |
| 2,149,994 | Frank et al. | Mar. 7, 1939 |